United States Patent [19]
Wasilewski et al.

[11] Patent Number: 5,341,425
[45] Date of Patent: Aug. 23, 1994

[54] METHODS AND APPARATUS FOR UNIQUELY ENCRYPTING DATA AT A PLURALITY OF DATA TRANSMISSION SITES FOR TRANSMISSION TO A RECEPTION SITE

[75] Inventors: Anthony J. Wasilewski, Alpharetta, Ga.; Keith Gammie, Markham, Canada

[73] Assignee: Scientific Atlanta, Inc., Atlanta, Ga.

[21] Appl. No.: 984,461

[22] Filed: Dec. 2, 1992

[51] Int. Cl.$^5$ .............................................. H04L 9/18
[52] U.S. Cl. ...................................... 380/20; 380/21; 380/45
[58] Field of Search ................... 380/20, 21, 44, 45, 380/46, 50

[56] References Cited

U.S. PATENT DOCUMENTS

| | | | |
|---|---|---|---|
| 4,531,020 | 7/1985 | Wechselberger et al. | 380/21 |
| 4,605,820 | 8/1986 | Campbell, Jr. | 380/50 |
| 4,613,901 | 9/1986 | Gilhousen et al. | 380/21 |
| 4,634,808 | 1/1987 | Moerdar | 380/20 |
| 4,803,725 | 2/1989 | Horne et al. | 380/20 |
| 4,887,296 | 12/1989 | Horne | 380/20 |
| 5,029,207 | 7/1991 | Gammie | 380/21 |
| 5,093,860 | 3/1992 | Steinbrenner et al. | 380/21 |
| 5,115,467 | 5/1992 | Esserman et al. | 380/44 |
| 5,144,665 | 9/1942 | Takaragi et al. | 380/21 |
| 5,144,667 | 9/1992 | Pogue, Jr. et al. | 380/21 |
| 5,237,610 | 8/1993 | Gammie et al. | 380/21 |

OTHER PUBLICATIONS

Zeng, et al., "Pseudorandom Bit Generators in Stream-Cipher Cryptography," *Computer*, vol. 24, No. 2, pp. 8-17, (Feb. 1991).

*Primary Examiner*—Salvatore Cangialosi
*Attorney, Agent, or Firm*—Woodcock Washburn Kurtz Machiewicz & Norris

[57] ABSTRACT

In a data transmission system comprising a plurality N of transmission sites and at least one reception site, a set of data at each transmission site is uniquely encrypted by (a) providing each transmission site with a broadcast key unique to that transmission site and a system key that is the same for all transmission sites, the system key comprising a plurality S of bits and each of the broadcast keys comprising a unique plurality B of bits, wherein B is less than S; (b) convolving in a predetermined manner at each transmission site the system key and the broadcast key unique to that transmission site to generate a unique data encryption key for that transmission site; (c) encrypting the set of data at each transmission site with the unique data encryption key generated at that site. The sets of data uniquely encrypted at each transmission site are then transmitted to the reception site. There is stored, in a memory at the reception site, the system key and the of said broadcast keys to enable a selected one of the encrypted sets of data to be decrypted at the reception site. The memory capacity necessary to store the system key and the broadcast keys at the reception site is no greater than ((N×B)+S) bits. Alternatively, a plurality N of data sets at a single transmission site are encrypted in this manner.

45 Claims, 5 Drawing Sheets

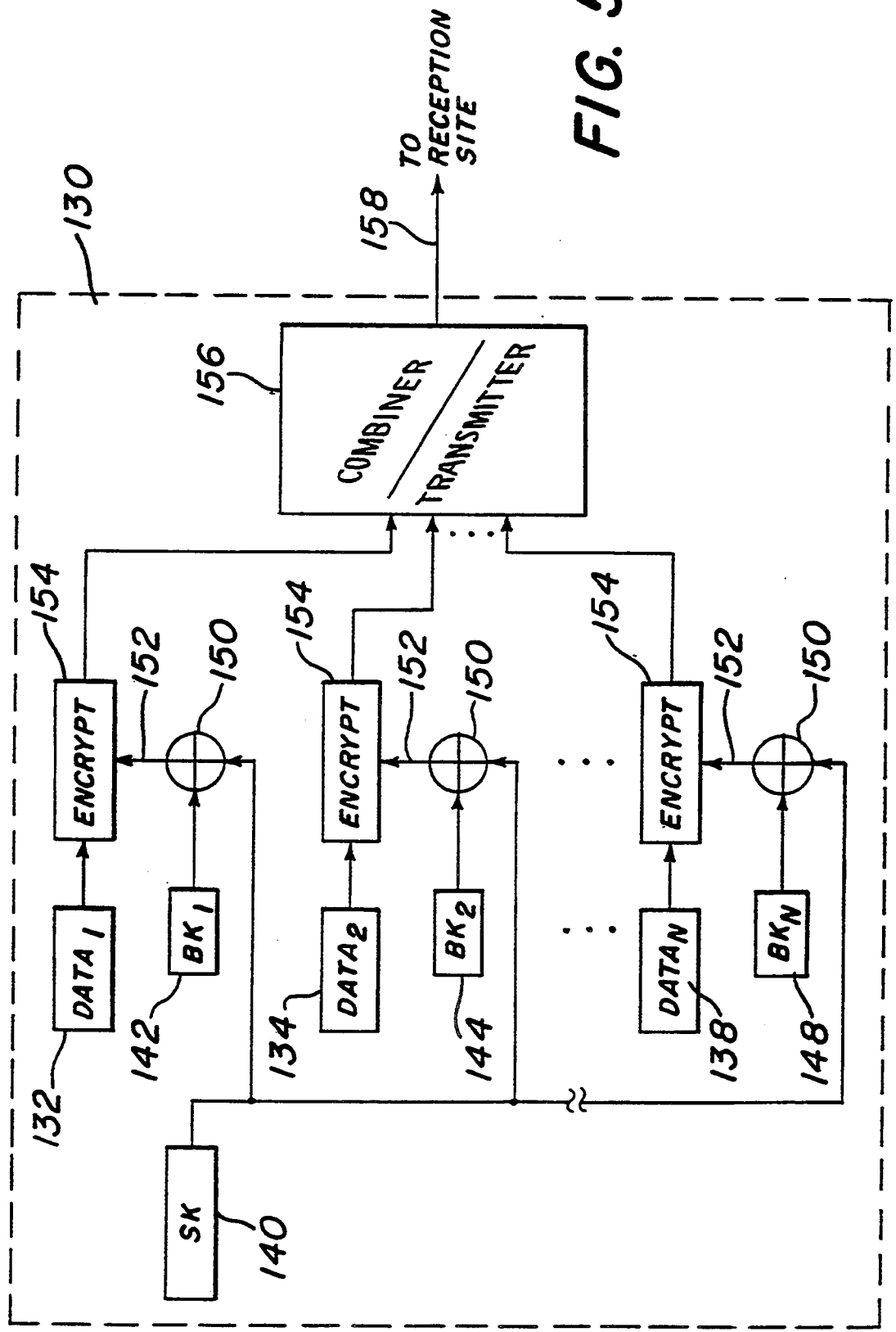

METHODS AND APPARATUS FOR UNIQUELY ENCRYPTING DATA AT A PLURALITY OF DATA TRANSMISSION SITES FOR TRANSMISSION TO A RECEPTION SITE

FIELD OF THE INVENTION

This invention relates generally to data encryption, and more particularly, to methods and apparatus for uniquely encrypting data at a plurality of transmission sites for transmission to and subsequent decryption at a reception site. With the methods and apparatus of the present invention, encryption key storage requirements at the reception site are reduced.

BACKGROUND OF THE INVENTION

Techniques for protecting digital information against unauthorized access are becoming increasingly important as more and more communications systems are employing digital transmission techniques. The subscription television industry, for example, is beginning to move toward all digital transmission systems or hybrid systems that employ both digital and analog transmission. Preventing unauthorized access to digital television signals is a major concern in the subscription television industry.

Cryptography can provide a very secure means of preventing unauthorized access. The art of cryptography is well known. "Stream-cipher cryptography" is particularly well suited for encrypting digital data to prevent unauthorized access. FIG. 1 shows an exemplary system 10 that employs stream-cipher cryptography. The system 10 comprises a data encryptor 12 for encrypting a clear data stream, a data decryptor 18 for subsequently decrypting the encrypted data stream, and a transmission medium 11 for transmitting the encrypted data stream from the encryptor 12 to the decryptor 18. The encryptors 12, 18 are commonly referred to in the art as "stream-ciphers."

As shown, data encryptor 12 comprises a pseudorandom bit generator 14 and a data combiner 16. At an input thereof, the pseudorandom bit generator 14 receives a unique encryption key K. Using the encryption key K as a "seed" value, the pseudorandom bit generator 14 generates a pseudorandom binary sequence commonly referred to as a "key stream". The key stream is then fed to one input of the combiner 16 which also receives, at another input thereof, the clear data stream. The combiner 16 combines or mixes the clear data stream with the key stream on a bit-by-bit basis using bitwise modulo-2 addition; that is, the combiner 16 comprises an exclusive-OR (XOR) gate. Combining the clear data stream with the key stream in this manner effectively encrypts the clear data stream. As shown, the encrypted data stream may then be transmitted via any suitable transmission medium 11.

A decryptor 18 operates to recover the clear data stream from the encrypted data stream. As shown, the decryptor 18 comprises a pseudorandom bit generator 14' and a de-combiner 16'. As those skilled in the art know, the decryptor 18 must be provided with the same encryption key K that was used to encrypt the data at the encryptor 12, and pseudorandom bit generator 14' must be identical to pseudorandom bit generator 14 so that with that same encryption key K, the pseudorandom bit generator 14' can reproduce the key stream generated at the encryptor 12. The reproduced key stream and the encrypted data stream are then provided to respective inputs of the de-combiner 16'. Decombiner 16' must operate in a reciprocal or complimentary manner with respect to the combiner 16 in the encryptor 12 so that the encryption process is effectively reversed. As those skilled in the art know, when combiner 16 performs bit-wise modulo-2 addition (i.e., XOR-ing), de-combiner 16' may be identical to combiner 16 since the XOR function is symmetrical. Thus, XOR-ing the encrypted data stream with the reproduced key stream effectively reverses the encryption process. The clear data stream is then output from the decombiner 16'.

As can be appreciated from the foregoing discussion, the system 10 cannot function unless both the encryptor 12 and decryptor 18 are each provided with the unique encryption key K. Security depends, therefore, on keeping the encryption key secret. Such a system is commonly referred to as a "private key" encryption system. One way to enhance security in a "private key" encryption system is to periodically change the encryption key. Security also depends on the "randomness" of the key stream generated by the pseudorandom bit generators. A system developer must select a pseudorandom bit generation algorithm that cannot feasibly be deduced by comparing the clear data stream with the encrypted data stream. Generally, greater randomness can be achieved with an algorithm that uses large encryption keys (i.e., more bits) rather than shorter keys.

In most applications, an encryptor is employed at a transmission site to encrypt a data stream for transmission to a remote reception site. The reception site, of course, must employ a decryptor in order to recover the clear data from the encrypted data. Because the reception site is remote from the transmission site, a secure means must be employed for providing the reception site with the appropriate encryption key. For example, the encryption key itself may be encrypted and then transmitted to the reception site. Once the key is received at the reception site, it must be stored in a secure memory device at the reception site. Alternatively, the key may be pre-stored in the secure memory.

Communication systems often comprise a plurality of different transmission sites that each transmit a set of data to one or more reception sites. For example, in a subscription television system, a plurality of "programmers" each provide subscription television services (i.e., programs) to remote subscribers. Each programmer typically will want to employ its own unique encryption keys to encrypt data at its respective transmission site. When the system contains a large number of transmission sites, providing each transmission site with a unique encryption key may become prohibitive. As mentioned above, it is desirable to employ large encryption keys in order to increase the cryptographic strength of the system. A problem arises because each of the unique encryption keys must be stored in a secure memory at a reception site so that a decryptor at the reception site is able to decrypt data received from any one of the transmission sites. As those skilled in the art know, secure memory is expensive and secure memory devices typically have limited storage capacities. There is a need, therefore, for a system and method that allows a large number of transmission sites to each uniquely encrypt data, but which reduces the amount of memory needed at a reception site to store encryption keys. The present invention satisfies this need.

SUMMARY OF THE INVENTION

According to one embodiment of the present invention, a set of data is uniquely encrypted at each of a plurality N of transmission sites for transmission to and subsequent decryption at at least one reception site. Each of the N transmission sites is provided with a broadcast key unique to that transmission site and a system key that is the same for all transmission sites. The system key comprises a plurality S of bits and each of the N broadcast keys comprises a unique plurality B of bits, wherein B is less than S. At each transmission site, the system key and the broadcast key unique to that transmission site are convolved in a predetermined manner to generate a unique data encryption key for that transmission site. The unique encryption key generated at each transmission site comprises a third number E of bits, E being at least greater than B. Preferably, E is greater than or equal to S. At each transmission site, a set of data is then encrypted with the unique data encryption key generated at that site. The sets of data uniquely encrypted at each transmission site are then transmitted to the reception site. There is stored, in a memory at the reception site, the system key and each of the broadcast keys to enable a selected one of the encrypted sets of data to be decrypted at the reception site. The memory capacity necessary to store the system key and the broadcast keys at the reception site is no greater than $((N \times B) + S)$ bits.

At the reception site, the encrypted set of data transmitted from a selected one of the transmission sites is received. According to the present invention, the system key and the broadcast key unique to the selected transmission site are retrieved from the memory at the reception site. Convolving means are provided at the reception site for convolving the retrieved system key and retrieved broadcast key, in the same predetermined manner as was performed at the selected transmission site, in order to reproduce the unique data encryption key employed at the selected transmission site to encrypt the received set of data. The received encrypted set of data may then be decrypted with the reproduced encryption key.

The reception site may be authorized to receive data from only a selected group of transmission sites. In such a case, the system key and only the broadcast keys of the selected group are stored in the memory at the reception site. Cryptographic strength may be enhanced by periodically changing the system key and or unique broadcast keys provided to each transmission site and stored in the memory at the reception site.

As applied in the context of a subscription television system, the transmission sites comprise programmer sites in the subscription television system that each transmit program data and encrypt the program data with locally generated program keys. In this application of the present invention, the program keys locally generated at the programmer sites are encrypted in accordance with the methods and apparatus of the present invention. The reception site in a subscription television system may be either a cable head-end installation or a subscriber location, such as a cable subscriber or a direct broadcast satellite subscriber.

In an alternate embodiment of the present invention, a plurality N of data sets at a single transmission site are each uniquely encrypted at that site for transmission to the reception site. In this embodiment, each of the N data sets is provided with a broadcast key that is unique to that data set and a system key that is the same for each data set. The following steps are then performed for each data set: (1) convolving in a predetermined manner the system key and the broadcast key unique to that data set to generate a unique data encryption key for that data set; (2) encrypting the data set with the unique data encryption key generated for that data set; and (3) transmitting the uniquely encrypted data set to the reception site. As in the previous embodiment, there is stored, in a memory at the reception site, the system key and each of said broadcast keys. These keys are necessary at the reception site to enable a selected one of the encrypted data sets to be decrypted at the reception site. Again, the memory capacity necessary to store the system key and the broadcast keys at the reception site is no greater than $((N \times B) + S)$ bits.

Further details and features of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 5 is a block diagram of a data transmission site operating in accordance with an alternate embodiment of the present invention.

DETAILED DESCRIPTION OF THE INVENTION

In a preferred embodiment, the present invention allows a plurality N of transmission sites to each uniquely encrypt a set of data for transmission to at least one reception site. Most importantly, however, with the method and apparatus of the present invention, unique encryption at each transmission site can be achieved without requiring a significant amount of storage capacity at the reception site for storing encryption keys. Although the present invention may be employed in any communication system requiring independent encryption of data at each of a plurality of transmission sites, the present invention has particular applicability in the context of a subscription television system. An exemplary subscription television system in which the present invention may be employed is described in co-pending U.S. patent application Ser. No. 968,846, filed Oct. 30, 1992, entitled "System and Method for Transmitting a Plurality of Digital Services" (Attorney Docket SA-0019A).

Figure 2:
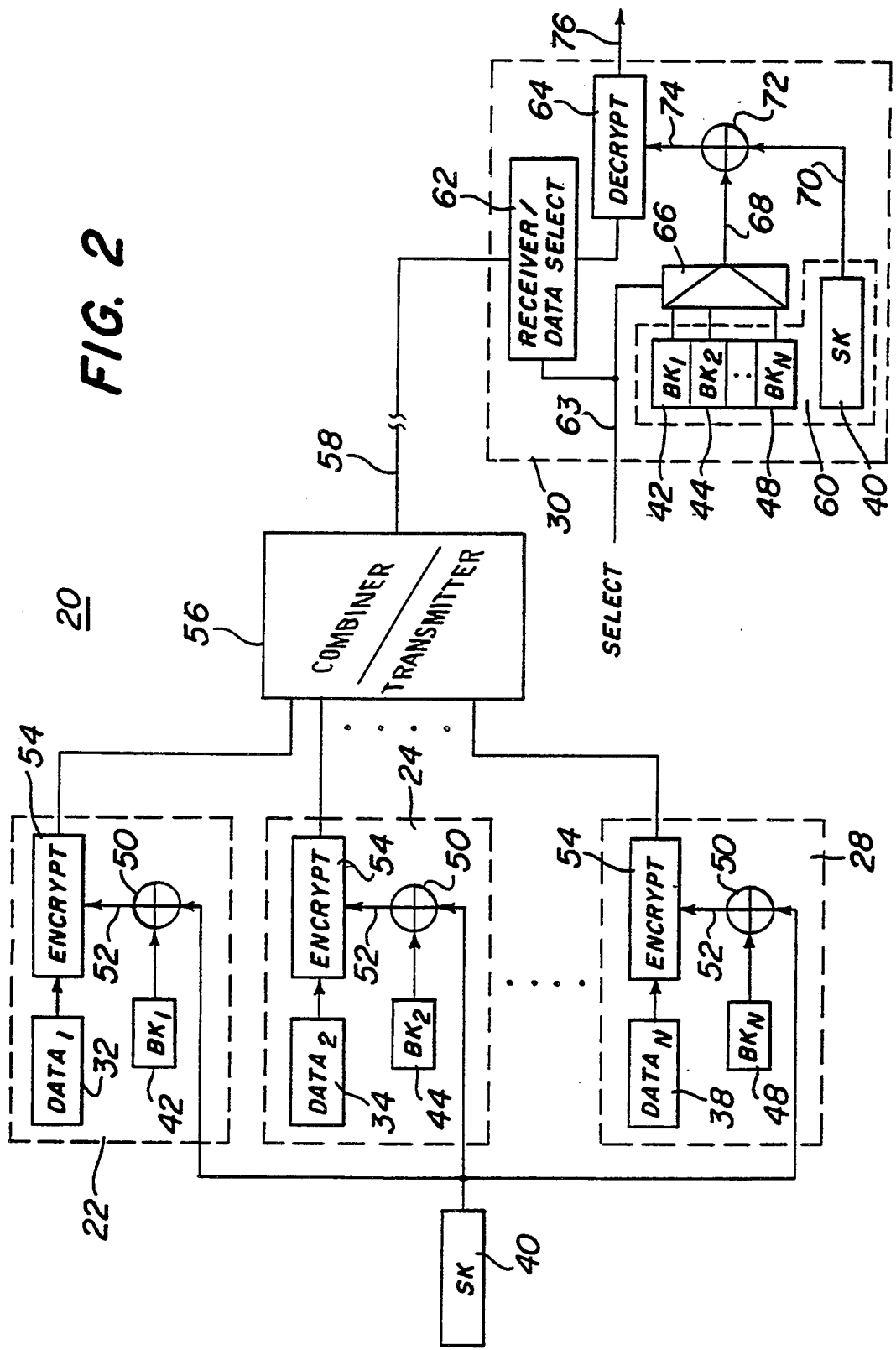
FIG. 2 shows a block diagram of a data transmission system operating in accordance with a preferred embodiment of the encrypting and decrypting methods and apparatus of the present invention.

Referring to the drawings wherein like numerals indicate like elements throughout, there is shown in FIG. 2 a functional block diagram of a system 20 comprising a plurality N of transmission sites 22, 24, 28 and at least one reception site 30. According to the present invention, a system key 40 is provided that is common to each transmission site 22, 24, 28. Each transmission site 22, 24, 28 is further provided with a respective broadcast key 42, 44, 48 that is unique to that transmission site. The system key "SK" comprises a first number of bits, S, and each broadcast key "BK" comprises a second number of bits, B. According to an important aspect of the present invention, B is less than S. For example, the system key may comprise 56 bits (S=56), whereas each broadcast key may comprise only 8 bits (B=8).

Any means may be employed for providing each transmission site with the system key 40 and broadcast key unique to that site. For example, both the system key and broadcast key may be transmitted to each respective transmission site from a remote location, such as a national control center, or one or both of the keys may be pre-stored at the transmission sites. Alternatively, at least the broadcast keys may be generated locally at the respective transmission sites. In the claims, the term "providing" has been used to cover all such possibilities.

Each transmission site 22, 24, 28 is provided with apparatus for encrypting a set of data, e.g. data 32, 34 and 38 respectively. As shown in FIG. 2, the encrypting apparatus at each transmission site 22, 24, 28 comprises means 50 for convolving the system key and the broadcast key unique to that site in a predetermined manner to generate a unique data encryption key for that site. As those skilled in the art can appreciate, there are infinite ways to convolve the system key and broadcast key at each transmission site to generate the unique encryption key at that site. For example, selected bits of the system key may be exclusive-OR'd with selected bits of the broadcast key. Alternatively, a much more complex convolution may be performed by, for example, passing the system key and broadcast keys through a complex one-way function. As used in the claims, (except as may be expressly limited therein) the term "convolving" is intended to cover all such possibilities, as well as other means of combining the bits.

According to the present invention, the unique data encryption keys generated at each transmission site 22, 24, 28 by the respective convolving means 50 each comprise a third number E of bits. Preferably, E is greater than or equal to S. As mentioned in the background, with larger encryption keys, greater "randomness" can be achieved during encryption of a clear data stream thereby increasing the cryptographic strength of the system. As those skilled in the art will appreciate, convolving the system key with a unique broadcast key at each transmission site provides each transmission site with a unique encryption key that is larger than the unique broadcast key alone. As will be described hereinafter, according to the present invention, only the system key and the broadcast keys need be provided at a reception site for decryption purposes. Consequently, the memory capacity necessary to store the system key and each of the broadcast keys at the reception site is no greater than $((N \times S) + S)$.

Figure 1:
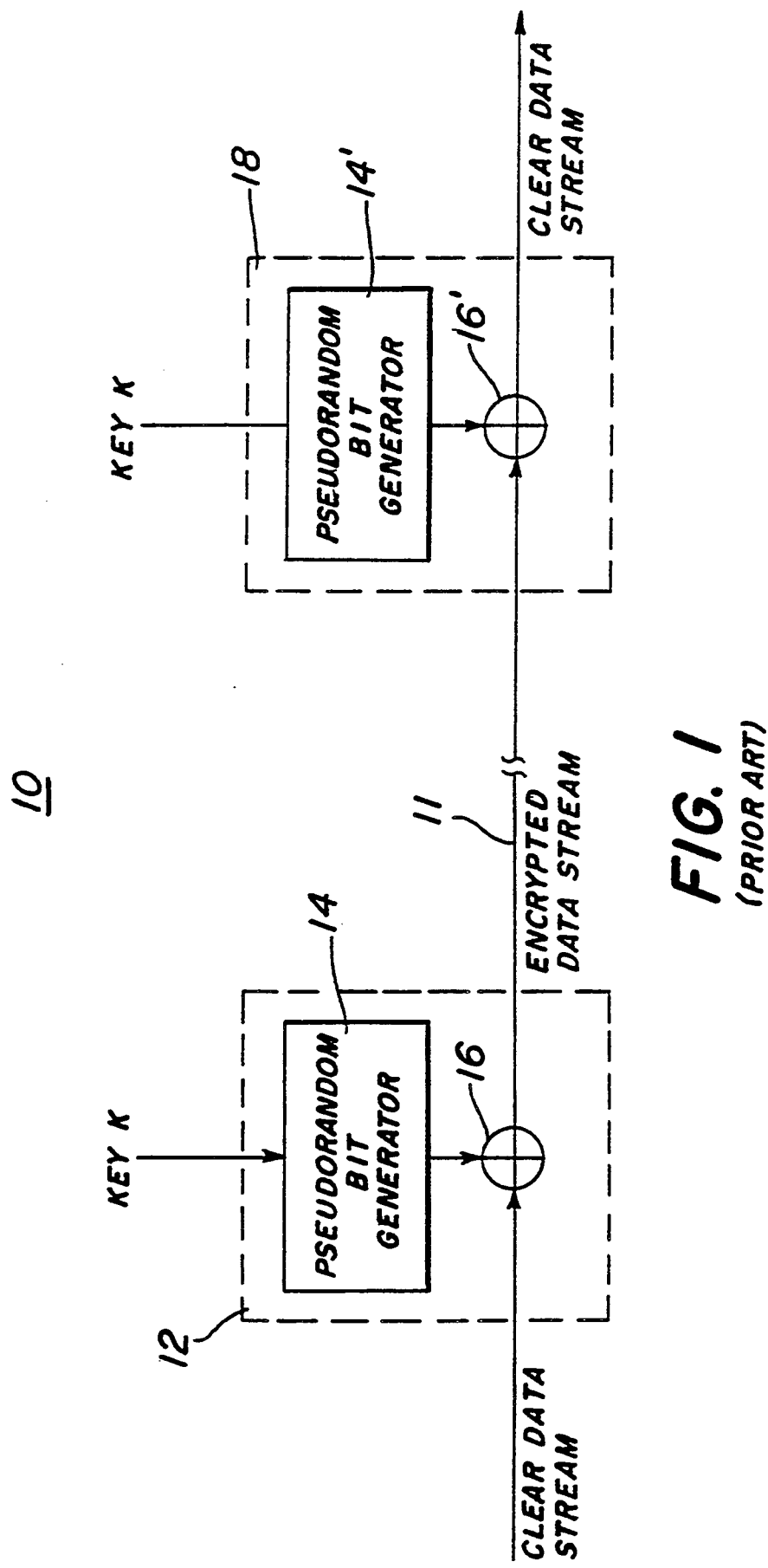
FIG. 1 is a block diagram of a prior art data transmission system employing cryptographic techniques.

Preferably, the convolving means 50 at each site 22, 24, 28 are identical; that is, they each convolve the system key with a respective broadcast key in the same predetermined manner. At each transmission site 22, 24, 28, the unique data encryption key generated by the convolving means 50 at that site is fed to a respective encryptor 54. As with the means 50 employed at each transmission site 22, 24, 28, the encryptors 54 employed at the respective transmission sites preferably function identically. Each encryptor 54 encrypts a respective set of data (e.g. data 32, 34 or 38) with the unique data encryption key generated by the convolving means 50 at the respective transmission site 22, 24, 28. As those skilled in the art know, there are many ways to implement a key-based encryptor, and the encryptor 54 at each transmission site 22, 24, 28 is not limited to any one implementation. For example, each encryptor 54 may be a stream cipher, such as encryptor 12 of FIG. 1. In such case, the pseudorandom bit generator in each encryptor 54 preferably will be identical. Alternatively, encryptor 54 may implement the well known Digital Encryption Standard (DES) algorithm. It will be appreciated by those skilled in the art that whatever encryption function the encryptors 54 implement, each encryptor 54 defines a one-way function.

Still referring to FIG. 2, the output of each encryptor 54 is coupled to a combiner/transmitter 56. Combiner/transmitter 56 operates to combine the encrypted sets of data output from each encryptor 54 and to transmit the combined data to a reception site, such as reception site 30. Combiner/transmitter 56 may combine the encrypted sets of data in any manner suitable for a given application. For example, combiner 56 may perform frequency-division multiplexing. Alternatively, combiner 56 may combine the encrypted data sets using a time-division multiplexing scheme. As those skilled in the art will appreciate, the function of combiner/transmitter 56 will depend upon a particular application of the present invention. In some applications, the combiner/transmitter 56 may be remotely located from each transmission site 22, 24, 28. In such cases, each of the transmission sites must first transmit its respective encrypted data set to that remote site. The encrypted sets of data must then be combined at the remote site and re-transmitted from that remote site to a reception site. For example, in a subscription television system, encrypted data is often individually transmitted from each transmitter location, via satellite, to a cable head-end installation. The cable head-end installation then operates to combine the individual encrypted data streams into a single cable television signal for transmission to one or more reception sites. It is understood that the system 20 does not require that all of the transmission sites transmit their respective encrypted data at the same time; at any given time, one or more transmission sites may be idle.

After combining, the encrypted sets of data are transmitted via a suitable medium 58 to a reception site, such as reception site 30. The system key 40 and each of the broadcast keys 42, 44, 48 are stored in a memory 60 at the reception site. Any method may be employed for supplying the memory 60 with the system key and broadcast keys. For example, the system key and broadcast keys may be pre-stored in the memory 60. Alternatively, the system key and/or broadcast keys may be transmitted to reception sites from a remote location, such as a national control center. If the broadcast keys are generated locally at each transmission site, each transmission site may be responsible for providing its respective broadcast key to the memory 60 by, for example, performing a field installation at the reception site or alternatively, by transmitting its respective broadcast key to the reception site for automatic insertion into the memory 60. As mentioned above, the memory capacity necessary to store the system key and each of the broadcast keys at a reception site is no greater than $((N \times B) + S)$. As described hereinafter, storage of these keys at a reception site enables an encrypted data set transmitted from a selected transmission site to be decrypted at the reception site.

Decrypting apparatus at the reception site 30 comprises a receiver 62 for receiving the encrypted sets of data transmitted from each transmission site and for selecting one of these received sets of data for decryption. As shown, a select line 63 controls the selection of one of the received sets of data. As with the combiner/transmitter 56, the detailed operation of receiver 62 depends upon the particular application of the present invention. When frequency-division multiplexing is employed, the receiver 62 functions as a tuner to receive an encrypted data set transmitted from a selected transmission site on a given carrier frequency. Alternatively, when time-division multiplexing is employed at the combiner/transmitter 56, the receiver 62 operates to demultiplex the incoming data signal and to retrieve a selected set of data from the multiplexed data stream. Thus, however the encrypted sets of data are combined, the receiver 62 operates accordingly to receive an encrypted set of data transmitted from a selected one of the transmission sites 22, 24, 28.

The decrypting apparatus at the reception site further comprises means for retrieving the system key 40 and the broadcast key unique to the selected transmission site (e.g., broadcast key 42, 44 or 48) from the memory 30. For example, if the encrypted data set transmitted from transmission site 22 is selected for reception at the receiver 62, then the system key "SK" and broadcast key 42 (BK$_1$) are retrieved from the memory 30. Any suitable retrieval means may be employed, such as, for example, direct memory addressing. In FIG. 2, the retrieving means is functionally depicted as an N-to-1 multiplexer 66 which accepts the user's selection via line 63 and outputs the appropriate broadcast key on line 68.

The retrieved system key and retrieved broadcast key are supplied to convolver means 72 via lines 70 and 68, respectively. Convolver means 72 convolves the retrieved system key and retrieved broadcast key to reproduce the unique encryption key employed at the selected transmission site to encrypt the received set of data. As can be appreciated, therefore, convolver means 72 must function in the same predetermined manner as the convolver means 50 at the selected transmission site. As mentioned above, the convolver means 50 at each transmission site are preferably identical. However, this does not have to be the case. If, however, the convolver means 50 at one or more transmission sites are different, then the decrypting apparatus at the reception site 30 must include a corresponding convolver means for each of the different convolver means employed at the various transmission sites. As those skilled in the art will appreciate, employing identical convolver means 50 at each transmission site simplifies the decrypting apparatus at the reception site 30 in that a single convolver means 72 may be employed.

The decrypting apparatus further comprises a decryptor 64 that accepts the received encrypted set of data and the reproduced encryption key at respective inputs and decrypts the encrypted set of data with the reproduced encryption key. The decrypted set of data is output via line 76 for use at the reception site as desired. As with the convolver means 72, the decryptor 64 must function identically to the encryptor 54 employed at the selected transmission site to encrypt the set of data; that is, the decryptor 64 and the encryptor 54 at the selected transmission site must implement the same encrypting function. For example, if the digital encryption standard (DES) algorithm is implemented by the encryptor 54 at the selected transmission site, then the decryptor 64 must implement that same algorithm. To simplify the decrypting apparatus at the reception site, the encryptors 54 at the various transmission sites are preferably identical. Again, however, this does not have to be the case so long as a decryptor is provided at the reception site for each different encryptor employed at the various encryption sites.

In operation, therefore, a given transmission site will be provided with the system key "SK" and a broadcast key "BK" that is unique to that site. For example, transmission site 22 will be provided with the system key "SK" and a broadcast key 42 (BK$_1$) that is unique to that site 22. At transmission site 22, the system key 40 and unique broadcast key 42 are convolved in a predetermined manner to generate a unique data encryption key for that transmission site 22. The unique data encryption key is then provided via line 52 to the encryptor 54 at site 22. The encryptor 54 encrypts a set of data 32 with the unique data encryption key. The encrypted set of data is then transmitted to the reception site 30. Each other transmission site (e.g., sites 24 and 28) may operate in a similar manner to provide their own encrypted sets of data. The encrypted sets of data from each transmission site will then be combined for transmission to the reception site 30.

At the reception site 30, the encrypted set of data transmitted from one of the transmission sites will be selected, via line 63, for reception and subsequent decryption. Accordingly, the selected set of data will be received by receiver 62 and provided to the decryptor 64. For example, the encrypted set of data transmitted from transmitter location 28 may be received and provided to the decryptor 64. Once the encrypted set of data is received, the system key 40 and broadcast key 48 (i.e., "BK$_N$") unique to transmission site 28 are retrieved from the memory 60. Convolving means 72 convolves the retrieved system key 40 and retrieved broadcast key 48 in the same predetermined manner as convolving means 50 at transmission site 28 in order to reproduce the unique data encryption key used at transmission site 28 to encrypt the set of data 38. The reproduced encryption key is then provided to the decryptor 64 which decrypts the received set of data.

As the foregoing illustrates, the method and apparatus of the present invention allow a plurality of transmission sites to each uniquely encrypt a respective set of data using a relatively large, unique encryption key (i.e., the unique encryption key generated by convolver means 50). Most importantly, however, the storage capacity of the memory 60 at a particular reception site is minimized because the unique encryption keys do not have to be stored; rather, the smaller broadcast keys are stored.

In many applications, a reception site may only be authorized to receive data from a selected group of transmission sites. According to the present invention, in such a case, only the system key and the broadcast keys of the selected group are stored in the memory 60 at the reception site. Because the memory 60 contains only the broadcast keys of the selected group of transmission sites, the decrypting apparatus is only able to decrypt data transmitted from those sites. Without the broadcast key of a particular transmission site, the decrypting apparatus is unable to reproduce the unique data encryption key used to encrypt data at that transmission site. Consequently, by storing only the broadcast keys of the selected group of transmission sites, access to data transmitted from other (i.e., unauthorized) sites is precluded. As those skilled in the art will appreciate, therefore, a conditional access scheme may easily be implemented with the method and apparatus of the present invention. Additionally, because various reception sites may only store the broadcast keys of a selected group of transmission sites, system security may not be entirely compromised if a system attacker is somehow able to determine the contents of the secure memory 60 at a single reception site.

To enhance system security, the system key and/or the broadcast key of each transmission site may be periodically changed. As those skilled in the art will appreciate, the keys must be changed at both the transmission and reception sites. Any method described above may be used to supply reception sites and transmission sites with new system and broadcast keys.

Figure 3:
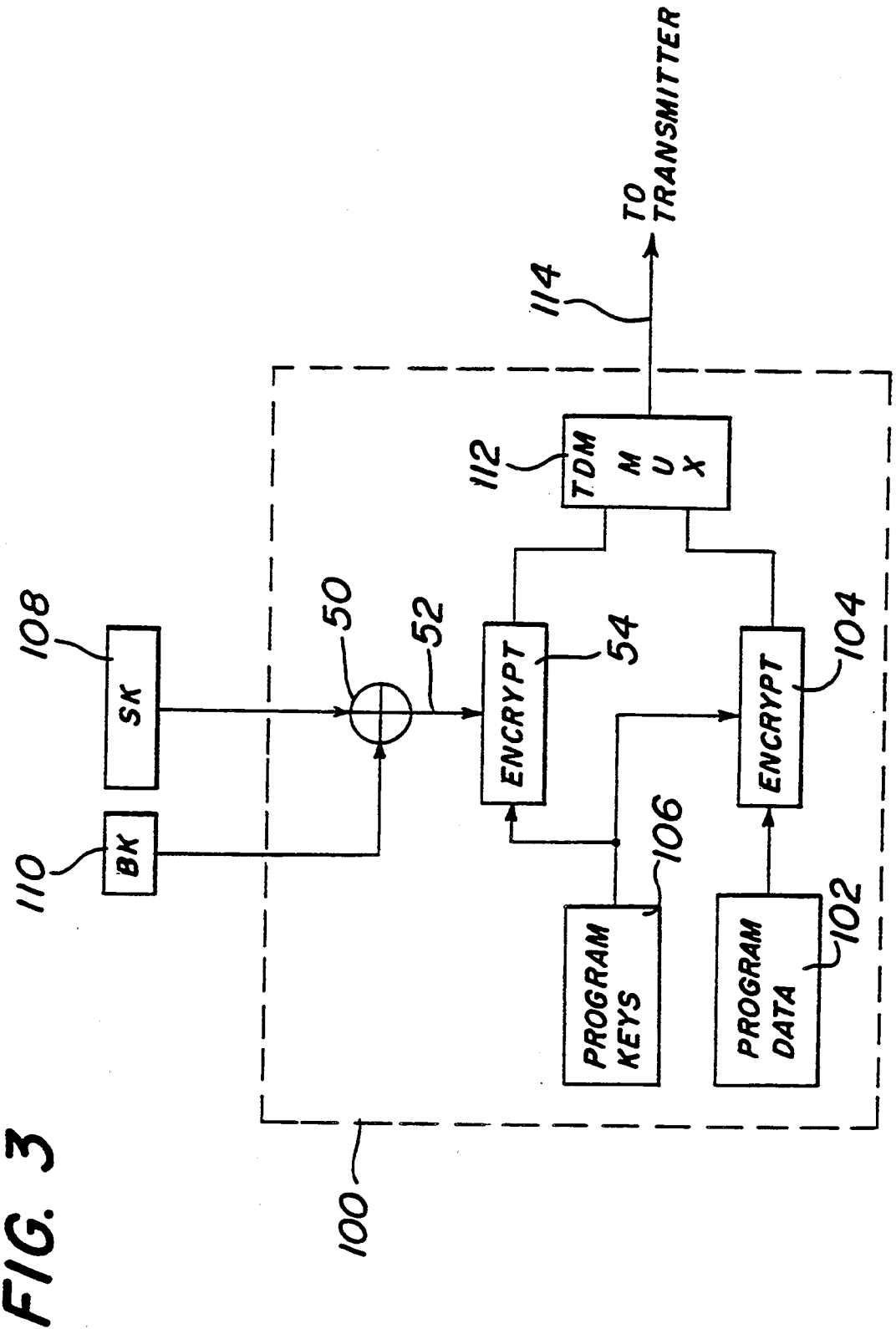
FIGS. 3 and 4 illustrate an application of the present invention to a subscription television system.

As mentioned previously, the present invention has particular applicability to subscription television systems. In a subscription television system, a plurality of individual "programmer" sites each provide program data (e.g. pay television services such as movies, news services and pay-per-view events) to a plurality of system subscribers. FIG. 3 is a functional block diagram of an exemplary "programmer" site that embodies the method and apparatus of the present invention.

As shown in FIG. 3, the exemplary programmer site 100 has an encryptor 104 for encrypting program data 102 at that site. Encryptor 104 encrypts the program data 102 with a locally generated "program key" 106. Encryption of program data by a "programmer" prevents unauthorized access to that programmer's data. As described in co-pending U.S. patent application Ser. No. 968,846, filed Oct. 30, 1992, entitled "System and Method for Transmitting a Plurality of Digital Services" (Attorney Docket SA-0019A), cryptographic strength is enhanced by changing the program key at fixed intervals. Preferably, the program key is changed several times a second. Consequently, a continuous stream of program keys is generated locally at the programmer site. As with any key-based encryption scheme, decryption can only take place if a decrypting apparatus is supplied with the same program keys used to encrypt the data. Accordingly, in a subscription television system, each programmer must supply the program keys used to encrypt its respective program data to any location that may desire to decrypt the program data. A preferable method of supplying remote locations with the necessary program keys is to multiplex the program keys with the data those keys were used to encrypt and then to transmit the multiplexed program keys and encrypted program data to the remote locations. Such a method is described in great detail in the aforementioned co-pending U.S. patent application entitled "System and Method for Transmitting a Plurality of Digital Services." System security will be compromised, however, if the program keys are intercepted during transmission. A programmer site, therefore, must also encrypt the transmitted program keys. In a subscription television system comprising a plurality of programmer sites, each programmer site typically wants to uniquely encrypt the program keys transmitted from that site. The method and apparatus of the present invention is particularly well suited for encrypting these program keys.

In accordance with the present invention, as applied in a subscription television system, each programmer site in the system is provided with a broadcast key unique to that programmer site and a system key that is the same for all sites. Any method may be employed for providing each programmer site with the system key and its respective broadcast key. Some subscription television systems contain a national control center, and in such systems, the system key and/or broadcast keys may be provided to each programmer site via satellite from the national control center. Preferably, however, each programmer will generate its respective broadcast key locally. Alternatively, the system key and/or broadcast keys could be delivered via any postal service. In the claims, the term "providing" is meant to cover all such possibilities. In FIG. 3, the system key and the broadcast key unique to the exemplary programmer site 100 are shown at blocks 108 and 110 respectively.

As shown in FIG. 3, convolving means 50 is provided at the programmer site 100 for convolving the system key 108 with the broadcast key 110 unique to that site to generate a unique encryption key for that site. Convolving means 50 of FIG. 3 may be identical to the convolving means 50 of FIG. 2. The unique encryption key generated by the convolving means 50 at programmer site 100 is fed to an encryptor 54 via line 52. Encryptor 54 of FIG. 3 may be identical to the encryptors 54 of FIG. 2. Encryptor 54 operates to encrypt the program keys 106 locally generated at the programmer site 100 with the unique encryption key generated by the convolving means 50. A multiplexer 112 accepts the encrypted program keys at one input and the encrypted program data at another input. Multiplexer 112 multiplexes the program keys and program data in any well known method, and transmits the multiplexed data to a reception site. As mentioned, a preferred method of multiplexing the encrypted program keys and program data for transmission to a reception site may be found in co-pending U.S. Patent application Ser. No. 968,864, filed Oct. 30, 1992, entitled "System and Method for Transmitting a Plurality of Digital Services" (Attorney Docket No. SA-0019A).

Figure 4:
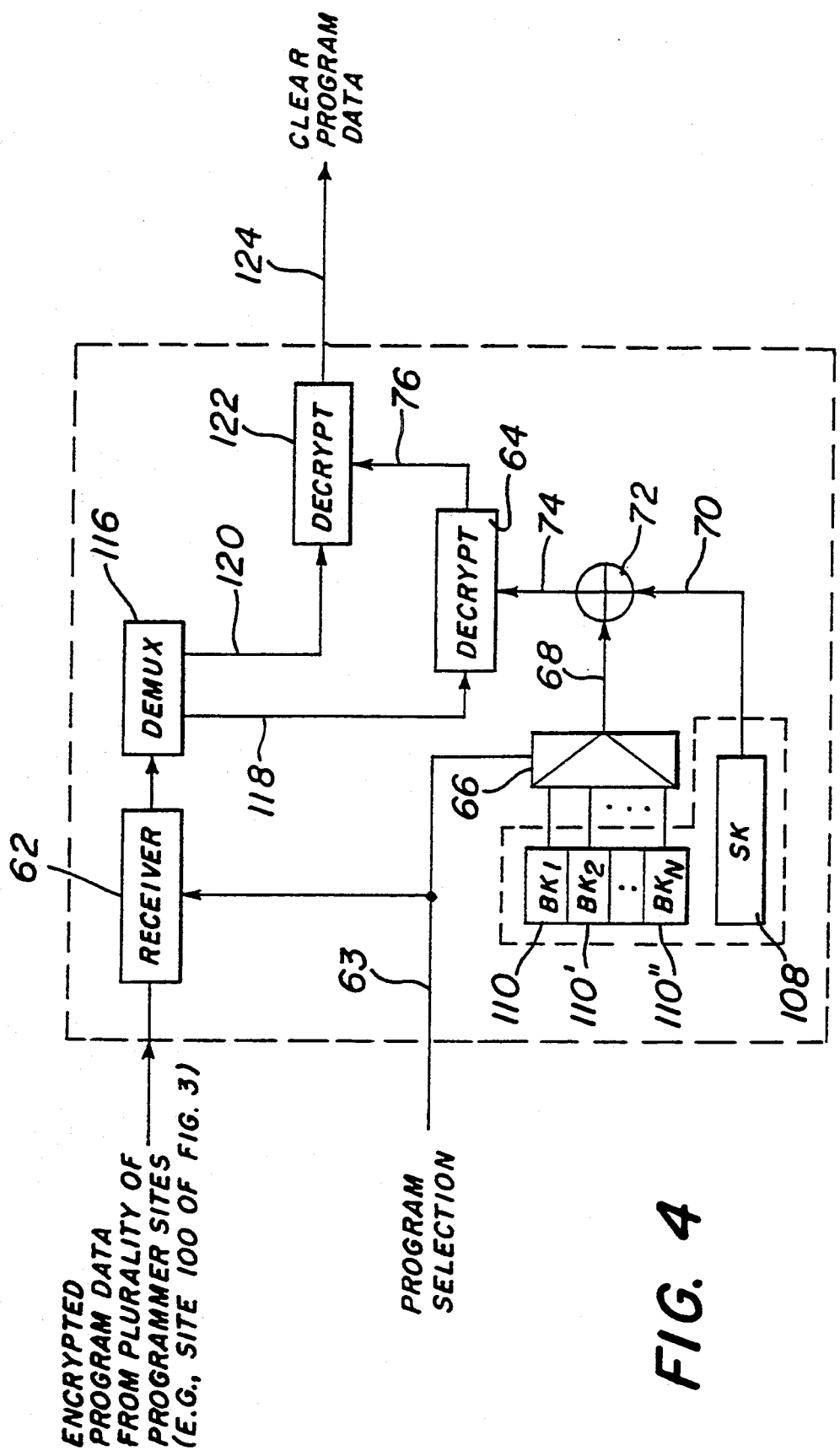

In a subscription television system that employs the method and apparatus of the present invention, the multiplexed program keys and program data generated at each programmer site typically will be transmitted from each site via a satellite to various reception sites. As those skilled in the art know, a reception site in a subscription television system may be a cable head-end installation, a cable subscriber or a direct broadcast satellite (DBS) subscriber. FIG. 4 is a functional block diagram illustrating the details of a subscription television system reception site embodying the present invention. As shown, encrypted program data and respective program keys transmitted from each of a plurality of programmer sites (e.g. site 100 of FIG. 3) are received at a receiver 62. Typically, the data transmitted from each programmer site is provided at the reception site on a distinct carrier frequency. In response to a selection signal provided on line 63, the receiver 62 will "tune" to an appropriate carrier frequency for receiving the program data and program keys transmitted from a selected one of the programmer sites. As explained above, the program data and program keys transmitted from a given programmer site will be in a multiplexed format. Consequently, as shown in FIG. 4, the data received from the selected programmer site is supplied to a demultiplexer 116. After demultiplexing, the received encrypted program data is provided to a decryptor 122 via line 120 and the received encrypted program keys are provided to a decryptor 64.

A memory 60 at the reception site stores the system key 108 and the broadcast key unique to each programmer site (e.g., keys 110, 110' and 110''). Any method may be employed for supplying the memory 60 with the system key and broadcast keys. For example, the system key and broadcast keys may be pre-stored in the memory 60. Alternatively, the system key and/or broadcast keys may be transmitted to reception sites from a remote location, such as a national control center, for automatic insertion into the memory 60. As mentioned, the broadcast keys preferably are generated locally at each programmer site. In such cases, an individual programmer may provide its respective broadcast key to a given reception site for insertion into the memory 60 at that site by, for example, performing a field installation at the reception site or alternatively, by transmitting its respective broadcast key to the reception site for automatic insertion into the memory 60.

Still referring to FIG. 4, means are provided for retrieving the system key 108 and the broadcast key unique to the selected transmission site (e.g., broadcast key 110, 110' or 110'') from the memory 60. Any suitable retrieval means may be employed, such as, for example, direct memory addressing. In FIG. 4, the retrieving means is functionally depicted as an N-to-1 multiplexer 66 which accepts the user's selection via line 63 and outputs the appropriate broadcast key on line 68.

The retrieved system key and retrieved broadcast key are supplied to convolver means 72 via lines 70 and 68, respectively. Convolver means 72 convolves the retrieved system key and retrieved broadcast key to reproduce the unique encryption key employed at the selected programmer site to encrypt the received program keys. Convolver means 72 must, of course, function in the same predetermined manner as the convolver means 50 at the selected programmer site. Decryptor 64 accepts the received encrypted program keys and the reproduced encryption key at respective inputs and decrypts the encrypted program keys with the reproduced encryption key. As with the convolver means 72, the decryptor 64 must function identically to the encryptor 54 employed at the selected programmer site; that is, the decryptor 64 and the encryptor 54 at the selected programmer site must implement the same encrypting function. The decrypted program keys are output via line 76 to decryptor 122. With the decrypted program keys, decryptor 122 is able to decrypt the received encrypted program data. The decrypted program data is then output via line 124 for use at the reception site as desired.

FIG. 5 illustrates an alternate embodiment of the present invention wherein the methods and apparatus described above are employed at a single transmission site 130 to enable a plurality N of data sets 132, 134, 138 at that transmission site 130 to be uniquely encrypted. According to this alternate embodiment, each data set 132, 134, 138 at the transmission site 130 is provided with a respective broadcast key 142, 144, 148 that is unique to that data set. A system key 140 is also provided that is common to all data sets 132, 134, 138. The system key "SK" comprises a first number of bits, S, and each broadcast key "BK" comprises a second number of bits, B. According to an important aspect of the present embodiment, B is less than S.

Any means previously mentioned may be employed for providing the transmission site 130 with the system key 140 and broadcast keys 142, 144, 148. In the claims, the term "providing" has been used to cover all such possibilities. For each data set 132, 134, 138, convolving means 150 are provided for convolving the system key 140 and the broadcast key unique to that data set in a predetermined manner to generate a unique data encryption key for that data set. Convolving means 150 may function identically to convolving means 50 of FIGS. 2 and 3. The unique data encryption keys generated for each data set 132, 134, 138 comprise a third number E of bits. Preferably, E is greater than or equal to S. As mentioned in the background, with larger encryption keys, greater "randomness" can be achieved during encryption of a clear data stream thereby increasing the cryptographic strength of the system. As those skilled in the art will appreciate, convolving the system key with a unique broadcast key for each data set provides each data set with a unique encryption key that is larger than the unique broadcast key alone. As will be described hereinafter, according to the present embodiment, the system key and the broadcast keys are stored in a memory at a reception site for decryption purposes. The memory capacity necessary to store the system key and each of the broadcast keys at the reception site is no greater than $((N \times B)+S)$.

Preferably, the convolving means 150 are identical; that is, they each convolve the system key with a respective broadcast key in the same pre-determined manner. The unique data encryption key generated by each convolving means 150 is fed to a respective encryptor 154. Each encryptor 154 encrypts its respective data set 132, 134, 138 with the unique data encryption key generated for that data set. The encryptors 154 may be identical to the encryptors 54 of FIG. 2 and 3. Preferably, the encryptors 154 each function in the same manner; that is they each encrypt data in accordance with the same encryption algorithm. As those skilled in the art know, there are many ways to implement a key-based encryptor, and the encryptors 154 are not limited to any one implementation. For example, each encryptor 154 may be a stream cipher, such as encryptor 12 of FIG. 1. In such case, the pseudorandom bit generator in each encryptor 154 preferably will be identical. Alternatively, the encryptors 154 may implement the well known Digital Encryption Standard (DES) algorithm. It will be appreciated by those skilled in the art that whatever encryption function the encryptors 154 implement, each encryptor 154 defines a one-way function.

Still referring to FIG. 5, the output of each encryptor 154 is coupled to a combiner/transmitter 156. Combiner/transmitter 156 operates to combine the encrypted data sets output from each encryptor 154 and to transmit the combined data to a reception site, such as reception site 30 of FIG. 1. Combiner/transmitter 156 may combine the encrypted sets of data in any manner suitable for a given application. For example, combiner 156 may perform frequency-division multiplexing. Alternatively, combiner 156 may combine the encrypted data sets using a time-division multiplexing scheme. As those skilled in the art will appreciate, the function of combiner/transmitter 156 will depend upon a particular application of the present invention.

As the foregoing illustrates, the alternate embodiment of the present invention described above provides a means for uniquely encrypting a plurality of data sets at a single transmission location for transmission to a reception site. As those skilled in the art will appreciate, reception site 30 of FIG. 1 may be employed to receive and decrypt a selected one of the encrypted data sets transmitted from the transmitter location 130 of FIG. 5. Whether encrypted data is transmitted from each of a plurality of transmission sites (as in FIG. 1) or a plurality of encrypted data sets are each transmitted from a single transmission site (as in FIG. 5), the reception site 30 of FIG. 1 operates in the same manner.

It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. A method for uniquely encrypting a set of data at each of a plurality N of transmission sites for transmission to and subsequent decryption at at least one reception site comprising the steps of:
   (a) providing each transmission site with a broadcast key unique to that transmission site and a system key that is the same for all transmission sites, said system key comprising a plurality S of bits and each of said broadcast keys comprising a unique plurality B of bits, wherein B is less than S;
   (b) convolving in a predetermined manner at each transmission site the system key and the broadcast key unique to that transmission site to generate a unique data encryption key for that transmission site, said unique encryption key comprising a third number E of bits, E being at least greater than B;
   (c) encrypting a set of data at each transmission site with the unique data encryption key generated at that site; and
   (d) transmitting the sets of data uniquely encrypted at each transmission site to the reception site;
   wherein there is stored, in a memory at the reception site, the system key and each of said broadcast keys for regenerating at the reception site, for the purpose of decrypting any one of said encrypted sets of data, the unique data encryption keys used to encrypt said sets of data at each respective transmission site, the memory capacity necessary to store the system key and the broadcast keys at the reception site being no greater than $((N \times B) + S)$ bits.

2. The method recited in claim 1 wherein the following steps are performed at the reception site:
   (e) receiving the encrypted set of data transmitted from a selected one of the transmission sites;
   (f) retrieving from the memory at the reception site the system key and the broadcast key unique to the selected transmission site;
   (g) convolving the retrieved system key and retrieved broadcast key in said predetermined manner to reproduce the unique data encryption key employed in step (c) to encrypt the received set of data, and
   (h) decrypting the received set of data with the reproduced encryption key.

3. The method recited in claim 1 wherein the reception site is authorized to receive data from only a selected group of transmission sites and wherein the system key and only the broadcast keys of the selected group are stored in the memory at the reception site.

4. The method recited in claim 1 wherein E is greater than or equal to S.

5. The method recited in claim 1 comprising the further step of periodically changing the system key provided to each transmission site and stored in the memory at the reception site.

6. The method recited in claim 1 comprising the further step of periodically changing the unique broadcast key provided to each transmission site and stored in the memory at the reception site.

7. The method recited in claim 1 wherein said transmission sites comprise programmer sites in a subscription television system that each transmit program data and encrypt the program data with locally generated program keys, and wherein the set of data encrypted in step (c) comprises said program keys.

8. The method recited in claim 7 wherein the reception site is one of a cable head-end installation and a subscription television system subscriber location.

9. In a data transmission system comprising a plurality N of transmission sites and at least one reception site wherein there is a system key common to all transmission sites and a broadcast key unique to each site, and wherein said system key comprises a first number S of bits and each of said broadcast keys comprises a second number B of bits wherein B is less than S, a method for uniquely encrypting a set of data at a transmission site comprising the steps of:
   (a) providing at the transmission site the system key and the broadcast key unique to that site;
   (b) convolving the system key and the broadcast key unique to that site to generate a unique data encryption key for that transmission site, said unique data encryption key comprising a third number E of bits wherein E is at least greater than B;
   (c) encrypting a set of data at the transmission site with the unique data encryption key generated at that transmission site; and
   (d) transmitting the set of data uniquely encrypted at the transmission site to the reception site;
   wherein there is stored, in a memory at the reception site, the system key and each of said broadcast keys for regenerating at the reception site, for the purpose of decrypting any one of said encrypted sets of data, the unique data encryption keys used to encrypt said sets of data at each respective transmission site, the memory capacity necessary to store the system key and the broadcast keys at the reception site being no greater than $((N \times B) + S)$ bits.

10. The method recited in claim 9 wherein the reception site is authorized to receive data from only a selected group of transmission sites and wherein the system key and only the broadcast keys of the selected group are stored in the memory at the reception site.

11. The method recited in claim 9 wherein E is greater than or equal to S.

12. The method recited in claim 9 wherein the system key provided at the transmission site and stored in the memory at the reception site is periodically changed.

13. The method recited in claim 9 wherein the unique broadcast key provided at the transmission site and stored in the memory at the reception site is periodically changed.

14. The method recited in claim 9 wherein said transmission site comprises a programmer site in a subscription television system that transmits program data encrypted with locally generated program keys, and wherein the set of data encrypted in step (c) comprises the locally generated program keys.

15. The method recited in claim 9 wherein the reception site is one of a cable head-end installation and a subscription television system subscriber location.

16. In a data transmission system comprising a plurality N of transmission sites and at least one reception site wherein each transmission site is provided with a broadcast key unique to that transmission site and a system key that is the same for all transmission sites, said system key comprising a first number S of bits and each of said broadcast keys comprising a second number B of bits where B is less than S, and wherein at each transmission site the system key and the broadcast key unique to that site are convolved in a predetermined manner to generate a unique data encryption key, the unique data encryption key generated at each site being used at that site to encrypt a set of data for transmission to the reception site, and further wherein there is stored, in a memory at the reception site, the system key and each of said broadcast keys, a method for decrypting at the reception site an encrypted set of data transmitted from a selected one of said transmission sites comprising the steps of:

(a) receiving the encrypted set of data transmitted from the selected one of the transmission sites;

(b) retrieving from the memory at the reception site the system key and the broadcast key unique to the selected transmission site;

(c) convolving the retrieved system key and retrieved broadcast key in said predetermined manner to reproduce the unique data encryption key generated at the selected transmission site; and (d) decrypting the encrypted data with the reproduced encryption key;

wherein the memory capacity necessary to store the system key and the broadcast keys at the reception site is no greater than $((N \times B) + S)$ bits.

17. The method recited in claim 16 wherein the reception site is authorized to receive data from only a selected group of transmission sites and wherein the system key and only the broadcast keys of the selected group are stored in the memory at the reception site.

18. The method recited in claim 16 wherein the unique data encryption key generated at each transmission site comprises a third number E of bits, and wherein E is greater than or equal to S.

19. The method recited in claim 16 wherein the system key provided at the transmission site and stored in the memory at the reception site is periodically changed.

20. The method recited in claim 16 wherein the unique broadcast key provided to each transmission site and stored in the memory at the reception site is periodically changed.

21. A method for uniquely encrypting each of a plurality N of data sets at a transmission site for transmission to at least one reception site, said method comprising the steps of:

(a) providing a broadcast key for each data set that is unique to that data set and a system key that is the same for each data set, said system key comprising a first number S of bits and each of said broadcast keys comprising a second number B of bits, wherein B is less than S;

(b) convolving in a predetermined manner, for each data set, the system key and the broadcast key unique to that data set to generate a unique data encryption key for that data set, the unique data encryption key comprising a third number E of bits, E being at least greater than B;

(c) encrypting each data set with the unique data encryption key generated for that set; and (d) transmitting each uniquely encrypted data set to the reception site;

wherein there is stored, in a memory at the reception site, the system key and each of said broadcast keys regenerating at the reception site, for the purpose of decrypting any one of said encrypted sets of data, the unique data encryption keys used to encrypt each of said sets of data at the transmission site, the memory capacity necessary to store the system key and the broadcast keys at the reception site being no greater than $((N \times B) + S)$ bits.

22. The method recited in claim 21 wherein the reception site is authorized to receive only a selected group of data sets and wherein the system key and only the broadcast keys for the selected group are stored in the memory at the reception site.

23. The method recited in claim 21 wherein E is greater than or equal to S.

24. The method recited in claim 21 comprising the further step of periodically changing the system key.

25. The method recited in claim 21 comprising the further step of periodically changing the unique broadcast keys provided for each data set and stored at the reception site.

26. In a data transmission system wherein each of a plurality N of data sets is uniquely encrypted at a transmission site by (a) providing a broadcast key for each data set that is unique to that data set and a system key that is the same for each data set, said system key comprising a first number S of bits and each of said broadcast keys comprising a second number B of bits where B is less than S, (b) convolving in a predetermined manner, for each data set, the system key and the broadcast key unique to that data set to generate a unique data encryption key for that data set, and (c) encrypting each data set with the unique data encryption key generated for that set, and wherein each of the uniquely encrypted data sets is transmitted to at least one reception site, and further wherein there is stored, in a memory at the reception site, the system key and each of said broadcast keys, a method for decrypting a selected one of said uniquely encrypted data sets at the reception site comprising the steps of:

(a) receiving the selected encrypted data set at the reception site;

(b) retrieving from the memory at the reception site the system key and the broadcast key unique to the selected data set;

(c) convolving the retrieved system key and retrieved broadcast key in said predetermined manner to reproduce the unique data encryption key generated at the transmission site; and (d) decrypting the encrypted data set with the reproduced encryption key;

wherein the memory capacity necessary to store the system key and the broadcast keys at the reception site is no greater than $((N \times B) + S)$ bits.

27. The method recited in claim 26 wherein the reception site is authorized to receive only a selected group of data sets and wherein the system key and only the broadcast keys for the selected group of data sets are stored in the memory at the reception site.

28. The method recited in claim 26 wherein the unique data encryption key generated for each data set comprises a third number E of bits, and wherein E is greater than or equal to S.

29. The method recited in claim 26 comprising the further step of periodically changing the system key.

30. The method recited in claim 26 comprising the further step of periodically changing the unique broadcast keys provided for each data set and stored at the reception site.

31. In a pay television system wherein a plurality N of programmer sites each transmit program data to at least one reception site, and wherein each programmer encrypts the program data transmitted from that site with locally generated program keys, the program keys being transmitted by each programmer to the reception site along with the encrypted program data, and wherein there is a broadcast key unique to each programmer site and a system key that is the same for all programmer sites, said system key comprising a first number S of bits and each of said broadcast keys comprising a second number B of bits where B is less than S, a method for uniquely encrypting the program keys at a programmer site for transmission to the reception site comprising the steps of:
 (a) providing at the programmer site the system key and the broadcast key unique to that programmer site;
 (b) convolving, in a predetermined manner, the system key and the broadcast key for that programmer site to generate a unique encryption key for that programmer site, the unique encryption key comprising a third number E of bits, E being at least greater than B;
 (c) encrypting the program keys with the unique encryption key generated at that programmer site; and
 (d) transmitting the encrypted program keys to the reception site, there being stored, in a memory at the reception site, the system key and each of said broadcast keys for regenerating at the reception site, for the purpose of decrypting the encrypted program keys transmitted from any one of said programmer sites, the unique data encryption keys used to encrypt the program keys at each of said programmer sites;
 wherein the memory capacity necessary to store the system key and the broadcast keys at the reception site being no greater than $((N \times B) + S)$ bits.

32. The method recited in claim 31 wherein the reception site is authorized to receive program data and respective program keys from only a selected group of programmer sites and wherein the system key and only the broadcast keys of the selected group are stored in the memory at the reception site.

33. The method recited in claim 31 wherein E is greater than or equal to S.

34. The method recited in claim 31 comprising the further step of periodically changing the system key provided at the programmer site and stored in the memory at the reception site.

35. The method recited in claim 31 comprising the further step of periodically changing the unique broadcast key provided at the programmer site and stored in the memory at the reception site.

36. In a pay television system wherein a plurality N of programmer sites each transmit program data to at least one reception site, and wherein each programmer encrypts the program data transmitted from that site with locally generated program keys, and wherein there is a broadcast key unique to each programmer site and a system key that is the same for all programmer sites, said system key comprising a first number S of bits and each of said broadcast keys comprising a second number B of bits where B is less than S, and wherein the program keys locally generated at each programmer site are encrypted by (a) providing at the programmer site the system key and the broadcast key unique to that programmer site, (b) convolving, in a predetermined manner, the system key and the broadcast key for that programmer site to generate a unique encryption key for that programmer site, and (c) encrypting the program keys at that programmer site with the unique encryption key generated at that programmer site, and wherein each programmer transmits its respective encrypted program keys and encrypted program data to the reception site, and further wherein there is stored, in a memory at the reception site, the system key and each of said broadcast keys, a method for decrypting, at the reception site, the program keys and program data transmitted from a selected one of the programmer sites comprising the steps of:
 (a) receiving the encrypted program data and the encrypted program keys transmitted from the selected programmer site;
 (b) retrieving from the memory at the reception site the system key and the broadcast key unique to the selected programmer site;
 (c) convolving the retrieved system key and retrieved broadcast key in said predetermined manner to reproduce the unique encryption key generated at the selected programmer site;
 (d) decrypting the encrypted program keys with the reproduced encryption key; and
 (e) decrypting the encrypted program data with the decrypted program keys;
 wherein the memory capacity necessary to store the system key and the broadcast keys at the reception site is no greater than $((N \times B) + S)$ bits.

37. A data transmission system comprising a plurality N of transmission sites that each transmit a set of data to at least one reception site, there being a system key common to all transmission sites and a broadcast key unique to each site, said system key comprising a first number S of bits and each of said broadcast keys comprising a second number B of bits wherein B is less than S, each of said transmission sites having an encrypting apparatus comprising:
 means for convolving, in a predetermined manner, the system key and the broadcast key unique to that transmission site to generate a unique data encryption key for that site;
 an encryptor for encrypting a set of data with the unique data encryption key; and
 means for transmitting the encrypted set of data to the reception site, said reception site having a decrypting apparatus comprising:
 a memory for storing the system key and each of said broadcast keys, the storage capacity of the memory necessary to store the system key and each of the broadcast keys being no greater than $((N \times B) + s)$ bits;

means for receiving an encrypted set of data transmitted from a selected one of said transmission sites;

means coupled to the memory for retrieving from the memory the system key and the broadcast key unique to the selected transmission site and for convolving the retrieved system key and the retrieved broadcast key in said predetermined manner to reproduce the unique data encryption key generated at the selected transmission site; and a decryptor that decrypts the received set of data with the reproduced encryption key.

38. The system recited in claim 37 wherein said unique data encryption key comprises a third number E of bits, and wherein E is greater than or equal to S.

39. The system recited in claim 37 further comprising means for periodically changing the system key provided to each transmission site and stored in the memory at the reception site.

40. The system recited in claim 37 further comprising means for periodically changing the unique broadcast key provided to each transmission site and stored in the memory at the reception site.

41. Encrypting apparatus for use in a data transmission system comprising a plurality N of transmission sites and at least one reception site wherein there is a system key common to all transmission sites and a broadcast key unique to each transmission site, said system key comprising a first number S of bits and each of said broadcast keys comprising a second number B of bits wherein B is less than S, said encrypting apparatus for use at one of said transmission sites and comprising:

means for convolving, in a predetermined manner, the system key and the broadcast key unique to that transmission site to generate a unique data encryption key for that site;

an encryptor for encrypting a set of data with the unique data encryption key; and means for transmitting the encrypted set of data to the reception site;

wherein there is stored, in a memory at the reception site, the system key and each of said broadcast keys for regenerating at the reception site, for the purpose of decrypting the encrypted set of data transmitted from any one of said transmission sites, the unique data encryption keys used to encrypt said sets of data at each respective transmission site, the memory capacity necessary to store the system key and the broadcast keys at the reception site being no greater than $((N \times B)+S)$ bits.

42. Decrypting apparatus for use in a data transmission system comprising a plurality N of transmission sites and at least one reception site wherein each transmission site is provided with a broadcast key unique to that transmission site and a system key that is the same for all transmission sites, said system key comprising a first number S of bits and each of said broadcast keys comprising a second number B of bits where B is less than S, and wherein at each transmission site the system key and the broadcast key unique to that site are convolved in a predetermined manner to generate a unique data encryption key, the unique data encryption key generated at each site being used at that site to encrypt a set of data for transmission to the reception site, said decrypting apparatus for use at the reception site and comprising:

a memory for storing the system key and each of said broadcast keys, the storage capacity of the memory necessary to store the system key and the broadcast keys being no greater than $((N \times B)+S)$ bits;

means for receiving an encrypted set of data from a selected one of said transmission sites;

means for retrieving from the memory the system key and the broadcast key of the selected transmission site from said memory;

means for convolving the retrieved system key and the retrieved broadcast key in said predetermined manner to reproduce the unique data encryption key generated at the selected transmission site for encrypting the received set of data; and a decryptor for decrypting the received set of data with the reproduced encryption key.

43. Apparatus for uniquely encrypting a plurality N of data sets at a transmission site for transmission to at least one reception site wherein there is provided at the transmission site a broadcast key for each data set that is unique to that data set and a system key that is the same for each data set, said system key comprising a first number S of bits and each of said broadcast keys comprising a second number B of bits, B being less than S, said apparatus comprising:

means for convolving, in a predetermined manner, the system key and the broadcast key of a selected data set to generate a unique data encryption key for that data set;

an encryptor for encrypting a data set with the unique data encryption key generated for that data set; and means for transmitting an encrypted data set to the reception site;

wherein there is stored, in a memory at the reception site, the system key and each of said broadcast keys for regenerating at the reception site, for the purpose of decrypting the encrypted set of data transmitted from any one of said transmission sites, the unique data encryption keys used to encrypt said sets of data at each respective transmission site, the memory capacity necessary to store the system key and the broadcast keys at the reception site being no greater than $((N \times B)+S)$ bits.

44. Apparatus recited in claim 43 wherein said unique data encryption key comprises a third number E of bits, and wherein E is greater than or equal to S.

45. Decrypting apparatus for use in a data transmission system comprising a transmission site and at least one reception site wherein each of a plurality N of data sets is uniquely encrypted at the transmission site by (a) providing a broadcast key for each data set that is unique to that data set and a system key that is the same for each data set, said system key comprising a first number S of bits and each of said broadcast keys comprising a second number B of bits where B is less than S, (b) convolving in a predetermined manner, for each data set, the system key and the broadcast key unique to that data set to generate a unique data encryption key for that data set, and (c) encrypting each data set with the unique data encryption key generated for that set, and wherein each of the uniquely encrypted data sets is transmitted to the reception site, said decrypting apparatus for use at the reception site and comprising:

a memory for storing the system key and each of said broadcast keys, the storage capacity of the memory necessary to store the system key and the broadcast keys being no greater than $((N \times B)+S)$ bits;

means for receiving a selected one of the encrypted data sets transmitted from the transmission site;

means for retrieving from the memory the system key and the broadcast key unique to the selected data set;

means for convolving the retrieved system key and the retrieved broadcast key in said predetermined manner to reproduce the unique data encryption key generated at the transmission site for encrypting the received selected data set; and a decryptor for decrypting the received data set with the reproduced encryption key.

* * * * *